(12) United States Patent
Schwarz et al.

(10) Patent No.: US 8,489,727 B2
(45) Date of Patent: Jul. 16, 2013

(54) ACTIVE STORAGE AREA NETWORK DISCOVERY SYSTEM AND METHOD

(75) Inventors: William Schwarz, King George, VA (US); Aliabbas H. Syed, Farmingville, NY (US); Raymond J. Young, Ronkonkoma, NY (US)

(73) Assignee: CA, Inc., Islandia, NY (US)

( * ) Notice: Subject to any disclaimer, the term of this patent is extended or adjusted under 35 U.S.C. 154(b) by 1165 days.

(21) Appl. No.: 11/089,730

(22) Filed: Mar. 25, 2005

(65) Prior Publication Data

US 2006/0071684 A1    Apr. 6, 2006

Related U.S. Application Data

(63) Continuation of application No. 10/890,317, filed on Jul. 12, 2004, now abandoned.

(60) Provisional application No. 60/486,791, filed on Jul. 11, 2003.

(51) Int. Cl.
| G06F 15/173 | (2006.01) |
| G06F 15/177 | (2006.01) |
| G06F 3/00   | (2006.01) |

(52) U.S. Cl.
USPC ........... 709/224; 709/220; 709/221; 709/223; 710/15; 710/17; 710/18

(58) Field of Classification Search
USPC ................ 709/220–226, 248, 249; 710/15, 710/17–19
See application file for complete search history.

(56) References Cited

U.S. PATENT DOCUMENTS

| 6,170,067 | B1   | 1/2001  | Liu et al.               |
| 6,178,529 | B1   | 1/2001  | Short et al.             |
| 6,343,320 | B1   | 1/2002  | Fairchild et al. ............. 709/224 |
| 7,194,538 | B1 * | 3/2007  | Rabe et al. ................ 709/224 |
| 7,328,260 | B1 * | 2/2008  | Muthiyan et al. ............. 709/224 |
| 7,403,987 | B1 * | 7/2008  | Marinelli et al. ............. 709/223 |
| 7,734,712 | B1 * | 6/2010  | Meyer et al. ................ 709/213 |
| 7,961,594 | B2 * | 6/2011  | Alon et al. ................... 370/216 |
| 2003/0093509 | A1 * | 5/2003 | Li et al. ..................... 709/223 |
| 2003/0208581 | A1 * | 11/2003 | Behren et al. ............... 709/223 |
| 2004/0111505 | A1 * | 6/2004 | Callahan et al. ............. 709/223 |

FOREIGN PATENT DOCUMENTS

| WO | WO 02/37225 A2  | 5/2002  |
| WO | WO 02/102013 A2 | 12/2002 |

OTHER PUBLICATIONS

Woithe et al., "Bluefin—A common Interface for SAN Management," Internet Citation Aug. 13, 2002, XP002488396 (retrieved Aug. 13, 2002), © 2002 Storage Networking Industry Association.
Communication from EPO enclosing supplementary European Search Report under Article 153(7) EPC for HCD/J00048468EP, Appln. 04756962.9-2416/1654653 PCT/US2004/022521, Sep. 12, 2008.
Communication from the Formalities Officer at the European Patent Office in Germany mailed Apr. 1, 2009 regarding Application No. 04756962.9-2416, Apr. 1, 2009.

* cited by examiner

*Primary Examiner* — Tae Kim
(74) *Attorney, Agent, or Firm* — Baker Botts, LLP

(57) ABSTRACT

An active SAN discovery system and method responds to events occurring in SAN by automatically broadcasting for information related to the occurred events and updating the SAN topology according to the collected information.

19 Claims, 4 Drawing Sheets

ACTIVE STORAGE AREA NETWORK DISCOVERY SYSTEM AND METHOD

CROSS-REFERENCE TO RELATED APPLICATIONS

This application is a Continuation of U.S. Ser. No. 10/890,317 filed on Jul. 12, 2004 now abandoned and claims the benefit of U.S. Provisional Patent Application No. 60/486,791 entitled "ACTIVE SAN DISCOVERY", filed on Jul. 11, 2003, the entire disclosure of which is incorporated herein by reference in its entirety.

TECHNICAL FIELD

This application relates to storage area network management, and particularly to active SAN discovery system and method.

BACKGROUND

The storage area network (SAN) refers to a high-speed special purpose network that interconnects different kinds of data storage devices with associated data servers on behalf of a larger network of users. Providing the storage area network administrator complete, up-to-date information about the SAN without doing a complete sweep of the SAN has been an ongoing problem. Such a discovery effort not only requires manual intervention, but can also take a long time to complete in a large SAN environment. Delay in the time to complete can also lead to an outdated, incorrect view of the SAN and can limit the SAN administrator's flexibility in allocating and maintaining the expensive SAN resources. Accordingly, a discovery method that would overcome the shortcomings of conventional discovery methods is desirable.

SUMMARY

Active storage area network discovery method and system are provided. The method in one aspect includes automatically detecting an event occurring in a storage area network, determining one or more devices associated with the event, requesting information about the one or more devices from a plurality of hosts connecting to the storage area network by automatically broadcasting to the plurality of hosts, receiving the information, and updating one or more properties associates with the storage area network with the information.

The system in one aspect includes an event module operable to capture events occurring on a storage area network switch. A policy module is operable to automatically invoke one or more discovery functions based on one or more events captured by the event module. A discovery module comprising at least the one or more discovery function, is operable to discover current status of the storage area network switch.

Further features as well as the structure and operation of various embodiments are described in detail below with reference to the accompanying drawings. In the drawings, like reference numbers indicate identical or functionally similar elements.

DETAILED DESCRIPTION

Active SAN discovery of the present disclosure in one embodiment allows the user to define policies regarding intended connectivity. Whenever a device is connected to or disconnected from the SAN, an event is spawned and policy checks are triggered. If the connectivity is not what was originally intended, for instance, from checking a preset policy, the user has the option to deny the device access.

In one embodiment, the system and method of the present disclosure monitors the configuration changes and preserves information related to those configuration changes.

In one aspect, the system and method of the present disclosure creates new device discovery events, which a user can automate for further setup of a new device, for example, by tying it into a SAN manager's event correlation system and launch, for example, a disk array setup wizard. If the device is a host, access rights are checked by policies, for instance, to provide security by preventing unauthorized access to data.

Another aspect of the system and method of the present disclosure creates a discovery change log to allow the user to report on all configuration changes and check for errors. In one embodiment, the events have the time stamps of when the changes actually happened rather than the timestamp when a scheduled discovery finds the change.

In one embodiment, the system and method described in this application enables the updating of SAN resource information without the need for manually initiating or scheduling a discovery. In one embodiment, the system and method is an ongoing event driven process that responds automatically to changes in the real life SAN environment. It is defined through a set of events generated by agents or agent policies and specific discovery actions.

Any event that has been generated will trigger one or more corresponding discovery functions that will discover or rediscover the parts that were affected by the event and will populate the CA Common Services CORE (Worldview repository) with the discovered or rediscovered objects. Thus, up-to-date view of the SAN topology is made available. In another aspect, an audit log that includes recorded changes may be kept.

Examples of changes in SAN that may occur include a new device being connected to a SAN switch, or a switch becoming the new principal switch in a fabric. In these cases, the policy that generated the event will intelligently select the discovery function. The SAN discovery process communicates its requests for new information by broadcasting to host agents that are located on SAN attached hosts to see what information changed in-band.

Figure 1:
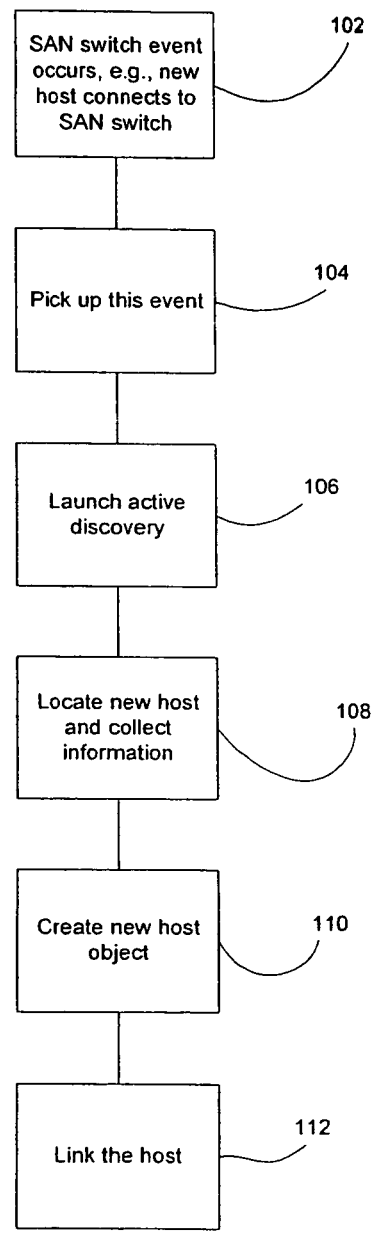
FIG. 1 shows a flow diagram illustrating a method of the present disclosure in one embodiment.

For instance, FIG. 1 shows a flow diagram illustrating a method of the present disclosure in one embodiment. At 102, when a new host is joined to a SAN by connecting the host's HBA (host bus adapter) port to a switch port on a SAN switch, a policy in the system and method of the present disclosure at 104, for example, the health policy, picks this event up as a name server change in the SAN switch and automatically launches active discovery procedure of the system and method of the present disclosure at 106. Active discovery then uses the broadcast mechanism to locate the new host and collect information about it at 108. The information sent by the agents, together with the discovery information residing in the switch, are used to create a new host object in the Worldview repository at 110, and to link the host with the corresponding switch in the SAN topology view at 112. The change is recorded in the active discovery change log.

For instance, events may be triggered as a result of the following occurrences in the SAN: HBA added or removed from SAN attached host; device bus rescan on SAN attached host; fabric split or fabric merge; new principal switch in fabric; new host joined (connected to) or disconnected from fabric; new disk array joined (connected to) or disconnected from fabric; new tape library joined (connected to), disconnected from fabric; WWN (world wide name) change on switch port or devices were switched; offline device went online or online device went offline; etc.

Figure 2:
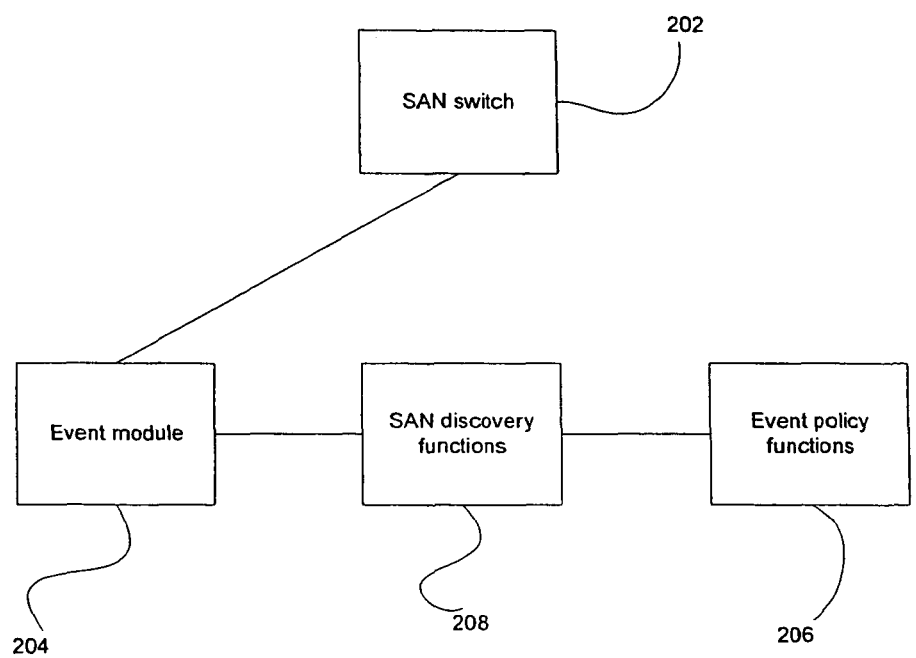
FIG. 2 is a block diagram illustrating components of the system of the present disclosure in one embodiment.

FIG. 2 is a block diagram illustrating components of the system of the present disclosure in one embodiment. The events module 204 captures events generated from the SAN switch 202 and automatically, for example as software-driven and controlled, invokes appropriate actions to take place. For example, if a user disconnects a device from a port on the SAN switch 202, the system of the present disclosure automatically removes the device from the Worldview view. Similarly, if the user reconnects the port to a device, the device and link is automatically added to the Worldview view.

When the SAN switch 202 sends a trap SNMP Administrator (aws_sadmin) receives this SNMP request and the SNMP gateway is responsible for the managing SNMP requests. SNMP refers to simple network management protocol that governs network management and the monitoring of network devices and their functions. The message is then put on the Distributed State Bus where DSM (distributed storage matrix) can now manage it. For instance, DSM may change trap data reply due to polling, and user input into object state changes, for example, by using the Finite State Machine (FSM) Logic.

In one embodiment, three event policy functions may be launched after discovering name server changes on the switch. These functions may create the events listed above after analyzing the new configuration.

ABASIC_DiscoverSwitchPort is invoked whenever a user needs to discover a port because an event is received which shows that a port is online and is now connected to a host or a device. Another function, DiscoverSwitchPortByWWN available from SANDISC.DLL, may be called within the ABASIC_DiscoverSwitchPort to make host/device linked to the port. DiscoverSwitchPortByWWN is called with the following parameters: Repository, <User name>, <Password>, SwitchName, SwitchClass, PortWWN, <LogFile>, LOG_LEVEL_DEBUG. NULL is passed for User Name, Password and LogFile. The SANDISC.DLL handles these parameters.

ABASIC_UnDiscoverSwitchPort is called after a disconnect event has been detected and the user acknowledged the change. This means the device is now considered to be offline and more granular discovery actions may have to be performed based on the previous connectivity of the switch. ABASIC_UnDiscoverSwitchPort may be a wrapper function that calls UnDiscoverSwitchPortByWWN available from SANDISC.DLL to further handle the particular undiscovery scenario. In case of a host or a storage device, the device may be moved into an offline device folder in case it goes online again. If the connected device was another switch, this is a fabric split event and may need to be handled accordingly.

ABASIC_DiscoverFabricDomainIDChange function may be launched for Domain ID changes. This means that another switch has taken over the role of the principal switch in the fabric even though there were no connectivity changes. In turn, all fabric related properties may be updated.

The system of the present disclosure may include the following functions for the discovery of devices: DiscoverPort, UnDiscoverPort, DiscoverSwitch, DiscoverFabric, and FreeSandiscReturn. DiscoverPort function retrieves information about the port and what is connected to it. It also updates the Worldview repository with the latest information. The function first signs on to the Worldview repository and switch information is retrieved. Next, the specified port is discovered using SNMP. The follow up discovery action may be classified depending on the connectivity information stored in the repository. This is done by searching the repository for a matching WWN. The DiscoverDevice function is called to search for a remote WWN. If a match is not found, the device is created using proxy-less discovery. Proxy-less discovery uses information from the switch name-server table to create the device.

After the device is created, the policy information for the switch port is checked to make sure that if a device is reserved for the port, it matches the device that was created. If the reserved and actual devices do not match, a policy error is sent to the event console. Next, the device object is created in the Worldview repository and the switch port properties are updated. Finally, the device and switch are linked in the Worldview repository. Additional discovery functions that are launched from this particular function depending on proxy-less discovery methods are: DiscoverNewSwitch→MergeFabric, DiscoverFabric, DiscoverDiskSubsystem, DiscoverTapeSubsystem, DiscoverHost, and DiscoverNewHBA.

UnDiscoverPort function retrieves information about a switch port and removes the link from the port to a connected device. The device is moved to an offline device folder, depending on the type of the device, which was connected. This function spawns the following sub-functions: UndiscoverHost, UnDiscoverSwitch (switch still online)→SplitFabric, UnDiscoverSwitch (switch no longer online)→UnDiscoverSubFabric, UnDiscoverDiskSubsystem, UnDiscoverTapeSubsytem, RemoveHBAFromHost.

DiscoverSwitch function retrieves information about a switch and creates the fabric and topology links between the switch and other SAN devices. This function first signs on to the Worldview repository and switch information is retrieved. The latest switch information is discovered using SNMP. Next, this switch information is used to create the switches and ports in the Worldview repository. Finally, the DiscoverPort function is called for each port. DiscoverFabric function updates the fabric topology with the latest member and link information. This function first determines which devices are members of a fabric by signing on to the WorldView repository and searching for the fabric and devices. It discovers information about the switches in a fabric using SNMP to determine the current fabric membership. The fabric is created if it does not exist in the Worldview repository. Finally, devices are added and removed from the fabric so that it matches up with the discovered information. FreeSandiscReturn function frees the memory allocated for return codes.

SANproxy:DiscoverDevice function is used to dynamically discover changes in the visibility of connections on SAN attached hosts. It uses a broadcast mechanism to find out what devices can be seen from a host. Zone changes may have made new devices visible to a host that previously were not. A message is sent, for instance, using UDP (user datagram protocol) sockets to a list of IP (internet protocol) addresses inquiring if any host has knowledge of the Device IDs (identifiers) in question. This broadcast message is recognized by a proxy agent (sanproxy). The requester can inquire about a Node Device ID, a Port Device ID or both. If the SAN if FibreChannel, the Device ID may be in the form of a WWN (World Wide Name), that is, a Port WWN or Node WWN.

The hosts that receive the inquiry message and have an Active Discovery agent installed on it will respond, for, instance, for instance, using UDP sockets, to the requester if they have information about the Device IDs. No response is sent if the host does not have information about the Device IDs. The information received from all hosts responding within a given time period is collected and presented to the caller of this function.

SANproxy:NotifyBusRescan function is launched if sanproxy was restarted or a device bus rescan occurred on a SAN attached host. Active discovery will be launched to track all changes that occurred in visibility of attached devices.

Figure 3:
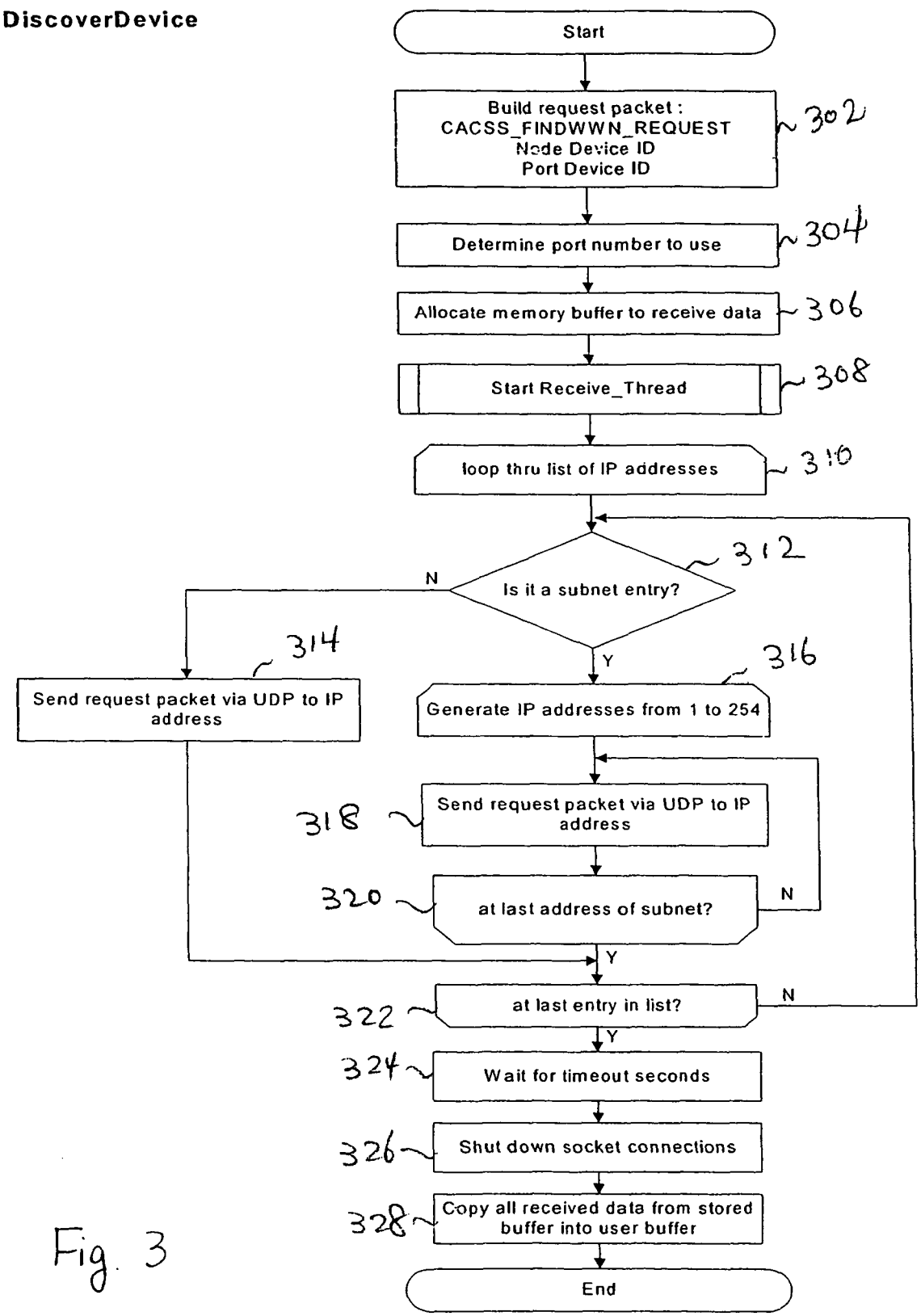
FIG. 3 is a flow diagram illustrating the DiscoverDevice function in one embodiment.

FIG. 3 is a flow diagram illustrating the DiscoverDevice function in detail in one embodiment. At 302, request packet is built, for instance, a UDP packet inquiring about devices. At 304, port number to use is determined. At 306, memory buffer is allocated to receive data. At 308, Receive_Thread function is called. This function will be described with reference to FIG. 4. At 310, list of IP addresses is looped through. At 312, if the entry is subnet entry, IP addresses are generated from 1 to 254 at 316. At 318, request packet is sent to IP address. Step 318 is repeated until the last address of subnet is processed at 320. At 312, if the entry is not a subnet entry, the request packet is sent to IP address and the method proceeds to 322.

At 322, if the last entry in the list is processed, at 324, the method waits for a predetermined period of time. At 326, socket connections are shut down. At 328, received data from stored buffer is copied into user buffer.

Figure 4:
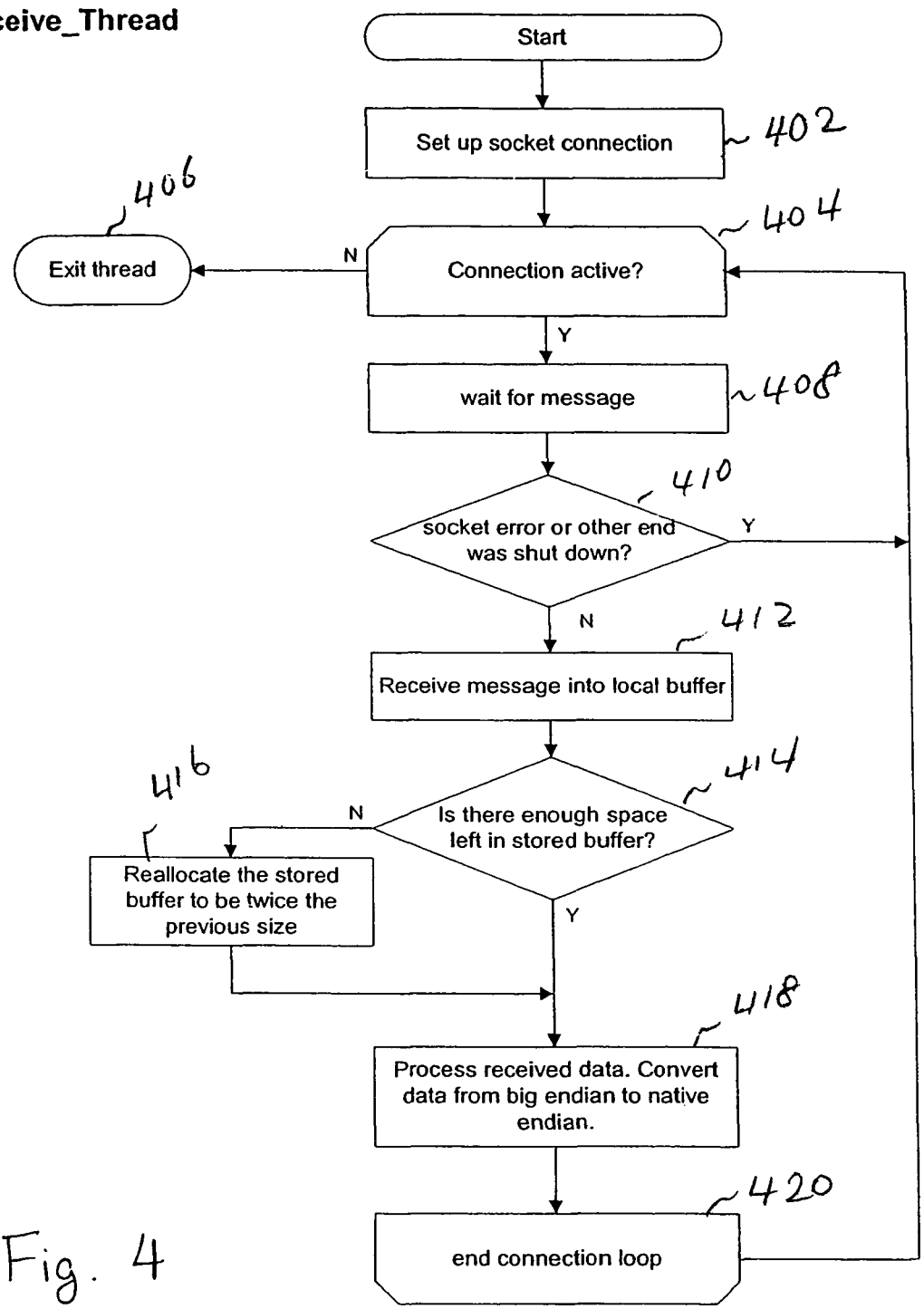
FIG. 4 is a flow diagram illustrating the Receive_Thread function in one embodiment.

FIG. 4 is a flow diagram illustrating the Receive_Thread function in detail in one embodiment. At 402, socket connection is set up. At 404, if the connection is not active, the function exits at 406. At 408, the process waits for one or more messages. At 410, connection is checked again. At 412, message is received into local buffer. At 414, a check is made to determine whether enough space is left in stored buffer. If not, at 416, buffer is reallocated to have larger size. At 418, data received is converted from big endian to native endian, if applicable. At 420, connection is ended.

The system and method of the present disclosure may be implemented and run on a general-purpose computer. The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. An active storage area network discovery method, comprising:
automatically detecting at a storage area network manager, an event occurring in a storage area network comprising a plurality of hosts, each host hosting at least one device;
determining a time when a change associated with the event actually occurred;
determining one or more devices associated with the event;
in response to detecting the event, requesting information about the one or more devices associated with the event from every host within the storage area network connecting to the storage area network by automatically broadcasting a request for information about the one or more devices associated with the event, the request specifically identifying the one or more devices associated with the event and being broadcast to every host within the storage area network connecting to the storage area network, wherein at least one of the plurality of hosts comprises at least one host unique from one or more hosts hosting the one or more devices associated with the event;
receiving the requested information;
updating one or more properties associated with the storage area network with the requested information; and
generating, for presentation to a user, an updated worldview of the storage area network comprising the updated properties associated with the storage area network.

2. The method of claim 1, further including creating a discovery change log associated with the event.

3. The method of claim 1, wherein the event automatically triggers:
determining a time when a change associated with the event actually occurred;
determining one or more devices associated with the event; and
upon detecting the event, requesting information about the one or more devices associated with the event from each of the plurality of hosts connecting to the storage area network by automatically broadcasting a request for information to each of the plurality of hosts, wherein at least one of the plurality of hosts comprises at least one host unique from one or more hosts hosting the one or more devices associated with the event.

4. The method of claim 1, further including creating an audit log that includes history of recorded changes.

5. The method of claim 1, wherein the event includes device changes in the storage area network.

6. The method of claim 1, wherein the event includes occurrence of at least one of host bus adapter added, host bus adapter removed, device bus rescan, fabric split, fabric merge, a new host connected to fabric, a host disconnected from fabric, a new disk array connected to fabric, a disk array disconnected from fabric, a new tape library connected to fabric, a tape library disconnected from fabric, world wide name change on switch port, a device switch, online device went offline, and offline device went online.

7. An active storage area network discovery system, comprising a general purpose computer, the general purpose computer comprising:
one or more processors, the one or more processors comprising:
an event module that captures events occurring on a storage area network switch comprising a plurality of hosts, each host hosting at least one device;
a policy module that automatically invokes one or more discovery functions based on one or more events captured by the event module wherein the policy module further compares captured events with at least one intended connectivity policy;
a discovery module comprising at least the one or more discovery functions that discover current status of the storage area network switch;
wherein, upon detecting an event captured by the event module, the discovery module is configured to broadcast a request for information about one or more devices associated with the event from every host within the storage area network, the request specifically identifying the one or more devices associated with the event, and wherein at least one of the plurality of hosts comprises at least one host unique from one or more hosts hosting the one or more devices associated with the event; and generating, for presentation to a user, an updated worldview of the storage area network comprising the updated properties associated with the storage area network.

8. A non-transitory program storage device readable by machine, tangibly embodying a program of instructions executable by the machine to perform a method, comprising:
  automatically detecting an event occurring in a storage area network comprising a plurality of hosts, each host hosting at least one device;
  determining a time when a change associated with the event actually occurred;
  determining one or more devices associated with the event;
  in response to detecting the event, requesting information about the one or more devices associated with the event from every host within the storage area network connecting to the storage area network by automatically broadcasting a request for information about the one or more devices associated with the event, the request specifically identifying the one or more devices associated with the event and being broadcast to every host within the storage area network connecting to the storage area network, wherein at least one of the plurality of hosts comprises at least one host unique from one or more hosts hosting the one or more devices associated with the event;
  receiving the requested information;
  updating one or more properties associated with the storage area network with the requested information; and
  generating, for presentation to a user, an updated worldview of the storage area network comprising the updated properties associated with the storage area network.

9. The storage device of claim 8, further including creating a discovery change log associated with the event.

10. The storage device of claim 8, wherein the event automatically triggers:
  determining a time when a change associated with the event actually occurred;
  determining one or more devices associated with the event;
  upon detecting the event, requesting information about the one or more devices associated with the event from each of the plurality of hosts connecting to the storage area network by automatically broadcasting a request for information to each of the plurality of hosts, wherein at least one of the plurality of hosts comprises at least one host unique from one or more hosts hosting the one or more devices associated with the event.

11. The storage device of claim 8, further including creating an audit log that includes history of recorded changes.

12. The storage device of claim 8, wherein the event includes device changes in the storage area network.

13. The storage device of claim 8, wherein the event includes occurrence of at least one of host bus adapter added, host bus adapter removed, device bus rescan, fabric split, fabric merge, a new host connected to fabric, a host disconnected from fabric, a new disk array connected to fabric, a disk array disconnected from fabric, a new tape library connected to fabric, a tape library disconnected from fabric, world wide name change on switch port, a device switch, online device went offline, and offline device went online.

14. The method of claim 1:
  wherein the event comprises the one or more devices attempting to connect to the active storage area network; and
  further comprising receiving from a user a denial of access denying the device access to the active storage area network.

15. The method of claim 1, further comprising comparing the requested information with at least one intended connectivity policy.

16. The storage device of claim 8:
  wherein the event comprises the one or more devices attempting to connect to the active storage area network; and
  further comprising receiving from a user a denial of access denying the device access to the active storage area network.

17. The storage device of claim 8, further comprising comparing the requested information with at least one intended connectivity policy.

18. The method of claim 1, further comprising:
  building a request packet to be used as the broadcasted request for information, wherein the request packet is built to request information specifically related to the detected event; and
  allocating memory to store the received requested information.

19. The method of claim 1, wherein receiving the requested information comprises receiving the requested information only from those hosts within the storage area network that have information about the one or more devices associated with the event.

* * * * *